UNITED STATES PATENT OFFICE 2,339,046

N,N - (ALPHA - BETA - ALKYLENE) - ACET -
AMIDES AND A PROCESS OF PREPARING
THEM

Herbert Bestian, Frankfort-on-the-Main-Hochst,
Germany; vested in the Alien Property Custodian No Drawing. Application March 28, 1941, Serial
No. 385,697. In Germany April 1, 1940

5 Claims. (Cl. 260—239)

The present invention relates to N,N-(alpha-beta-alkylene)-acetamides and to a process of preparing them.

I have found that N,N-(alpha-beta-alkylene)-amides of acetic acid are obtained by the reaction of ketene and alpha-beta-alkylene-imines. The reaction which consists in an addition of alpha-beta-alkylene-imine to ketene occurs, for instance as regards ethylene-imine, according to the following structural formula:

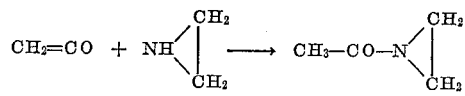

It may be advantageous to carry through the reaction in a solvent or diluent and to take care, by an effective cooling of the reaction vessel, that the heat being set free in a considerable portion during the addition process is led off. The solvents or diluents have suitably to be indifferent to ketene and the alpha-beta-alkylene-imine; there may be used, for instance, aliphatic ethers, hydrocarbons such as benzene, toluene, xylene, benzine, cyclohexane, furthermore halogenated hydrocarbons such as carbon tetrachloride or chlorobenzene. Water, however, is likewise suitable as a reaction medium.

Since 1 mol of the ketene reacts with 1 mol of the alkylene-imine, the starting materials are suitably used in about equimolecular proportions.

The reaction occurs already at very low temperatures. It is advantageous to choose not too high a temperature since otherwise the final products would polymerize. The reaction may, however, still be carried through at a temperature of about +60° C.

The N,N-alkylene-amides of the acetic acid obtained by the process in a good yield are best purified by distillation under reduced pressure. On working up the products obtained the presence of compounds of an acid action has to be avoided since in the acid pH-sphere a transformation of the products into polymers readily occurs.

As starting materials there may for instance be used alpha-beta-ethylene-imine, alpha-beta-propylene-imine, 1.2-butylene-imine, 2.3-butylene-imine and corresponding imines of higher aliphatic hydrocarbons as well as of aromatic hydrocarbons, for instance dodecyl-alpha-beta-ethylene-imine and phenyl-alpha-beta-ethylene-imine. There are obtained compounds of the general formula:

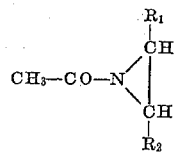

wherein $R_1$ and $R_2$ stand for hydrogen or a hydrocarbon radical.

The compounds obtained may be used as intermediate products for the manufacture of plastics and adjuvants in the textile industry.

The following examples serve to illustrate the invention, but they are not intended to limit it thereto, the parts being by weight:

(1) A three-necked apparatus, provided with a stirrer, a dropping funnel and a thermometer is used for the reaction. The reaction vessel is cooled with carbonic acid ice and acetone.

750 parts of anhydrous ether are first introduced into the apparatus and 210 parts of ketene are then added; the ketene dissolves in the strongly cooled ether. To the solution thus obtained a solution of 215 parts of ethylene-imine in 250 parts of anhydrous ether is caused to flow in in the course of 1–2 hours. The reaction occurs with a considerable heat effect. After the entire portion of ethylene-imine has been caused to flow in, the cooling device of the reaction vessel is removed and the temperature is allowed to rise to room temperature. The solution is worked up by distillation. After the distillation of the ether is complete there is obtained the N,N-ethylene-acetamide in the form of a dark red liquid boiling between 42° C. and 45° C. under a pressure of 15 to 20 mm. of mercury.

The N,N-ethylene-acetamide obtained in a good yield according to the afore-described process constitutes a transparent, readily mobile liquid of an odor resembling pyridine and piperidine. The liquid is readily soluble in water and all the usual organic solvents. In the pure condition it is stable without decomposition, whereas in the presence of acid acting compounds, for instance sulfurous acid, it may be polymerized so as to obtain a highly viscous compound.

(2) A solution of 210 parts of ketene in 750 parts of ether is prepared as described in Example 1 in the apparatus named in the preceding example. A mixture of 285 parts of alpha-beta-propylene-imine in 250 parts of anhydrous ether is caused to flow to the solution in the course of 1 to 2 hours. The reaction occurs with a considerable effect of heat. After the addition of the propylene-imine is complete, the cooling device of the reaction vessel is removed and the temperature is allowed to rise to room temperature. The solution is worked up by distillation. The N,N - (alpha - beta - propylene) - acetamide which distils between 52° C. and 55° C. under a pressure of 15 to 20 mm. of mercury is obtained in a good yield in the form of a transparent liquid. The compound has the same properties as the N,N-ethylene-acetamide described in Example 1.

(3) 25 parts of ketene are introduced without cooling the apparatus from outside, while stirring, into a solution of 21.5 parts of ethylene-imine in 300 parts of ether. The temperature rapidly increases to 35° C. so that the ether boils in a reflux condenser. After half an hour the introduction of the ketene is complete. The ether is evaporated and the N,N-ethylene-acetamide formed is distilled under reduce pressure. The yield amounts to 37 parts, i. e. 87 per cent of the theoretical yield.

(4) 50 parts of ketene are introduced in the course of 1 to 2 hours, while stirring and cooling with water of 15° C. to 20° C., into 43 parts of ethylene-imine of 100 per cent strength. During this operation the temperature increases to 40° C.–45° C. As soon as the effect of heat has ceased, the reaction of the ethylene-imine is complete. By a distillation under reduced pressure there is obtained the pure N,N-ethylene-acetamide in a yield of 79 parts, i. e. 93 per cent of the theoretical yield.

I claim:

1. The process of producing N,N-(alpha-beta-alkylene)-acetamides which comprises reacting ketene with an alpha-beta-alkylene-imine.

2. The process of producing N,N-(alpha-beta-alkylene)-acetamides which comprises reacting ketene with an alpha-beta-alkylene-imine at temperatures up to about 60° C.

3. The process of producing N,N-(alpha-beta-alkylene)-acetamides which comprises reacting ketene with an alpha-beta-alkylene-imine in the presence of a solvent and at temperatures up to about 60° C.

4. The process of producing N,N-ethylene-acetamide which comprises reacting ketene with ethylene-imine at temperatures up to about 60° C.

5. The process of producing N,N-(alpha-beta-propylene)-acetamide which comprises reacting ketene with propylene-imine at temperatures up to about 60° C.

HERBERT BESTIAN.